Oct. 15, 1968  M. L. E. VAN TITTELBOOM  3,406,046
PROCESS FOR CRYSTALLIZING DEXTROSE
Filed May 4, 1965
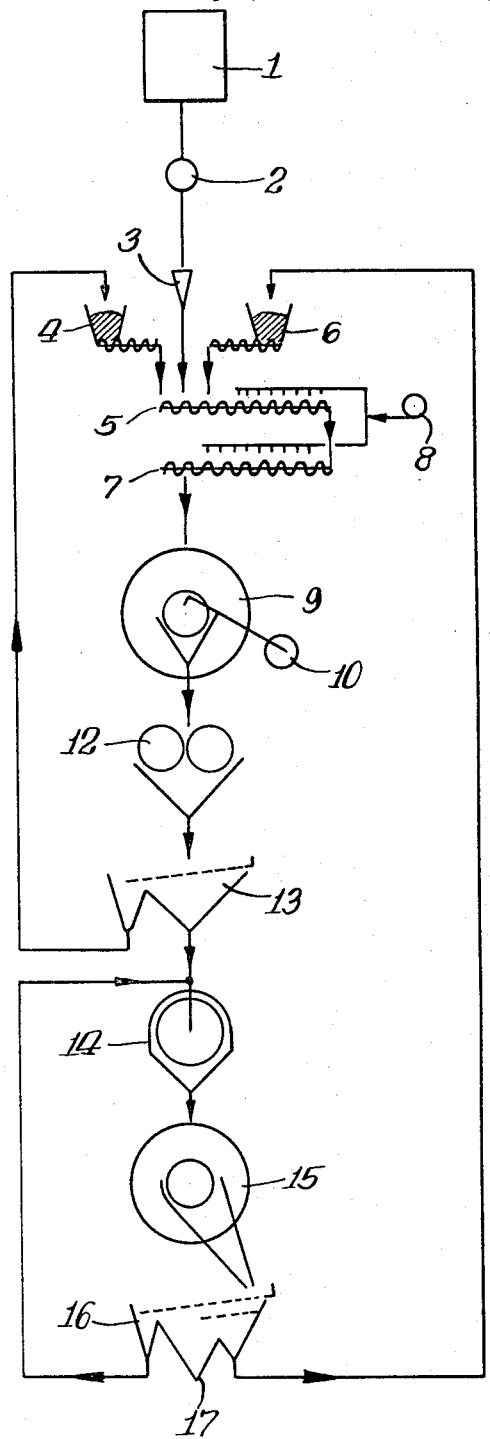
*Inventor:-*
*Marcel L. E. van Tittelboom,*
By *Michael Ancker*
*M. Lois Dierstein* Attys.

3,406,046
PROCESS FOR CRYSTALLIZING DEXTROSE
Marcel L. E. van Tittelboom, Sas van Gent, Netherlands, assignor to Corn Products Company, New York, N.Y., a corporation of Delaware
Filed May 4, 1965, Ser. No. 453,099
Claims priority, application Netherlands, May 21, 1964, 6405636
13 Claims. (Cl. 127—60)

This invention relates to a new and improved method for obtaining dextrose crystals consisting essentially of dextrose hydrate, from dextrose containing liquors, particularly, such as are produced by the enzymic hydrolysis of starch.

The main object of the invention is to provide a method for obtaining dextrose crystals consisting essentially of dextrose hydrate from the aforementioned dextrose containing liquors wherein the entire dextrose liquor is crystallized without formation of mother liquor. This new method eliminates the crystallizers, resulting in the fact that it also permits the elimination of the step of centrifuging the crystals to separate them from the mother liquor, as currently practiced, and reprocessing the mother liquor for additional yields of dextrose. Other objects will appear hereinafter.

The present invention provides a process for obtaining dextrose crystals, substantially all of which are in the hydrate form, from a dextrose containing liquor by first forming a thin layer of the liquor on agglomerates of dextrose crystals. A convenient way to accomplish this is to spray the liquor onto the agglomerates. Thereafter, the wetted agglomerates are contacted with dextrose particles which have a predetermined temperature, e.g., the agglomerates are coated with a thin layer of dextrose crystals. The contact of the crystals (which act as seed) with the wetted agglomerates results in substantially instantaneous crystallization of a substantial amount of the dextrose in the film and the agglomerates become free-flowing and substantially free of stickiness. The above operation may be repeated several times in order to crystallize a large amount of dextrose liquor. Because of the high rate of crystallization of the dextrose at the temperature used, a substantial proportion of the crystals is believed to be in the anhydrous form. The agglomerates now coated with a layer of a mixture of anhydrous and hydrate crystals are then subjected to a treatment or conditioning to complete crystallization of the dextrose in the film or liquor and to convert substantially all of the anhydrous crystals present in the layer or film to the hydrate form.

In carrying out the invention, any dextrose containing liquor which is supersaturated with respect to dextrose and which contains about 75 to about 88 percent, dry substance, may be used. The liquor to which the invention is particularly applicable is the total hydrolysate obtained by the enzymic hydrolysis of starch. Such liquors are well known in the industry and have concentrations of dextrose of about 90 percent to about 100 percent, dry basis.

The dextrose liquor which is used for wetting the agglomerates should have a temperature within the range of about 60 to about 80° C. during its application in order to spray it conveniently and evenly onto the agglomerates. Temperatures as low as 45° C. may be used also, but more care must be exercised in handling. It is advantageous to beat air into the liquor to speed up crystallization of the dextrose therein when it is applied to the agglomerates.

The temperature of the agglomerates during the wetting operation and coating with dextrose particles should be maintained within the range of about 15 to about 45° C., 15 to 30° C. being preferred.

The dextrose particles used for the coating or seeding should consist predominantly of crystals in the hydrate form.

The agglomerates which are to be treated may vary in size from that of dextrose crystals to small pellets. However, for practical operations, the size should not exceed about 10 mm. in diameter since it is difficult to grind agglomerates which are larger in size. The preferred size of the agglomerates is about 2 to 4 mm. in diameter.

The amount of liquor sprayed onto the agglomerates in each application may vary, the main limiting factor being to prevent stickiness to such a degree that the agglomerates cannot be handled efficiently. For practical operating conditions, the amount of liquor used for each wetting should be about 20 to about 33 percent, by weight, of the agglomerates, dry basis. If more than about 33 percent of liquor is used, the agglomerates will be difficult to handle due to stickiness. Similarly, the amount of dextrose particles used as seed in each application may vary but about 20 to about 33 percent, by weight, of the wetted agglomerates, dry basis, gives the most satisfactory results.

After the agglomerates have been wetted and coated or seeded with the dextrose particles, they are preferably subjected to a treatment, which I shall refer to as "conditioning," to permit complete crystallization of the dextrose in the film of liquor and to convert substantially all of the anhydrous crystals, if present, to the hydrate form. This may be accomplished by slowly agitating the agglomerates, in one or more stages, in suitable equipment. Generally, a period of time of about 2 to 4 hours is sufficient although this may vary depending, for example, upon the amount of agglomerates and anhydrous crystals present. During this time, the moisture content of the product should be maintained at about 8.5 percent to about 13 percent and the temperature should be maintained within the range of about 15 to 30° C. Good results may be obtained when the relative humidity of the atmosphere in the conditioning unit is within the range of about 70 to 90 percent.

The agglomerates resulting from the foregoing treatment may be passed through grinding or crushing rolls to produce material having the desired size for recycling. The remaining portion is subjected to an additional grinding operation to obtain the desired particle size for final end use.

In order to operate the invention in the most efficient manner, it is necessary to repeat the application of the thin film of dextrose liquor and also the dextrose particles to the agglomerates several times. The amount of liquor which can be crystallized in a single stage operation is limited because the agglomerates become too sticky to handle if too much liquor is applied to them. However, if the application of the film and seed is repeated several times, a considerably greater amount of liquor can be crystallized. Moreover, recycling of both agglomerates and seed is necessary to promote crystallization at a rate which will decrease the total so-called "in process" time of a predetermined amount of the liquor, to a minimum. The entire crystallizing, conditioning and grinding operation may be carried out in as little time as 5 hours.

The process of my invention is very advantageous in that it requires only a short time to carry out, the equipment is simple, takes up little space, and operational and maintenance costs are low. One of its main advantages is that it may be operated on a continuous basis.

The invention will be further illustrated by the accompanying drawing and the description which follows. However, it is not intended to limit the invention thereby.

In the drawing, which illustrates my invention diagrammatically, the numeral 1 represents a supply of the dextrose liquor. In a typical embodiment, this liquor had a density of 43.5° Bé., a dextrose equivalent of 94.5 percent, dextrose content of about 90 percent, and temperature of 80° C. The liquor is fed to a dosing pump 2, and then, optionally but preferably, into an agitator 3 wherein the liquor is agitated or whipped to incorporate air into said liquor which increases the total surface within the mass resulting in an accelerated rate of crystallization. The liquor is next sprayed, by means not shown, onto agglomerates of dextrose crystals which may be obtained from a previous run. These agglomerates, in the aforementioned embodiment, having a temperature of 23 to 25° C. are fed by means of a shaker gutter 4 into a slanting ribbon conveyor unit 5. At the outlet of 4, the agglomerates are sprayed with the liquor from 3 by means of small jets, not shown. The agglomerates in the run referred to consisted of dextrose hydrate crystals and had a diameter of 2.5 to 3.5 mm., and a moisture content of about 9 percent. The temperature of the wetted agglomerates was about 40° C. at this stage. The amount of dextrose liquor sprayed onto the agglomerates was about 20 percent, by weight, dry basis. The wetted agglomerates are conveyed forward in conveyor 5 and, as they are moved forward, they are coated with dextrose seed by means of a seed distributor 6 which consists of a shaker gutter. The amount of seed used in the run was about 20 percent, by weight, of the agglomerates, dry basis. The coated agglomerates are transferred from the conveyor 5 into another slanting ribbon conveyor 7 wherein they are mixed, for about 15 to 20 minutes, to permit substantially all of the dextrose in the liquor to crystallize, resulting in agglomerates which are dry and substantially free of stickiness. The temperature of the agglomerates was maintained at about 30° C. during the mixing operation. Cooling air from unit 8 is used in both units 6 and 7 to maintain the temperature at the desired level.

The dry agglomerates are then fed into a conditioning tube 9 where, in this run, they were held with slow agitation for about 2.5 hours to permit completion of the crystallization and to allow any anhydrous crystals present to be converted to the hydrate form. Cooling air is introduced at 10 to maintain the temperature at the desired level which in this run was 26° C.

The agglomerates are passed through a calibrating roll 12 and sifter 13. About 60 percent of the agglomerates is returned to the process at 4. The remainder is ground in mill 14 and dried in dryer 15 to a moisture content of about 9 percent. The dried material is screened at 16. A portion of the screened material is returned to the process for seed, at 6. The tailings are reground at 14. The third portion is packed in bags at 17. The final product consisted of dextrose hydrate crystals.

In another embodiment, the steps of spraying the liquor onto the agglomerates and then coating with seed were repeated three times before the agglomerates were fed into the conditioning tube 9.

Table I shows the amount of liquor and seed used in a run wherein triple coating was used.

Table II shows temperatures and moisture contents obtaining in a two-stage coating process wherein the amount of liquor and sed in each stage was the same as hereinabove described.

TABLE II

|  | Run A | | Run B | |
|---|---|---|---|---|
|  | ° C. | Percent $H_2O$ | ° C. | Percent $H_2O$ |
| Liquor for wetting | 80 | 17 | 80 | 17 |
| Liquor after agitation | 71 | | 71 | |
| Agglomerates for recycling | 25 | 9.46 | 23 | 9.62 |
| Agglomerates after wetted with liquor | 40 | 10.22 | 38 | 10.28 |
| Agglomerates after first coating with seed | 30 | 9.82 | 31 | 9.60 |
| Agglomerates after second coating with liquor and seed | 26 | 9.76 | 27 | 9.38 |
| Agglomerates after conditioning | 23 | 9.80 | 24 | 9.28 |
| Product after milling and drying | 28 | 8.84 | 28 | 9.83 |
| Final product | 26 | 8.68 | 26 | 8.61 |

I claim:

1. A process for obtaining dextrose crystals consisting essentially of dextrose hydrate crystals, from a liquor supersaturated with respect to dextrose and containing about 75 to about 88 percent, dry substance, which comprises
    (a) forming a thin layer of said liquor on agglomerates of dextrose crystals,
    (b) contacting the resultant wetted agglomerates with discrete dextrose particles whereby the thin layer of liquor begins to crystallize substantially instantaneously and the agglomerates become free-flowing and substantially free of stickiness;
the temperature of said agglomerates undergoing treatment in steps (a) and (b) being maintained within the range of 15 to 45° C., said dextrose crystals in said agglomerates of step (a) and the dextrose particles of step (b) being predominantly in hydrate form.

2. Process according to claim 1 wherein said liquor is agitated with air before forming said thin layer on said agglomerates of step (a).

3. Process according to claim 1 wherein the said agglomerates from step (b) are subjected to conditioning at a temperature of about 15 to about 30° C., while the moisture content of the agglomerates is maintained at a value of about 8.5 percent to about 13 percent to complete crystallization of said liquor and to convert substantially all of the anhydrous crystals in the agglomerates to the hydrate form.

4. Process according to claim 1 wherein said agglomerates in step (a) have a diameter not exceeding about 10 mm.

5. Process according to claim 4 wherein the final agglomerates are ground to a predetermined size, and a portion of these is recycled.

6. Process according to claim 1 wherein the said agglomerates from step (b) are subjected to conditioning in an atmosphere having a relative humidity within the range of about 70 to 90 percent and a temperature of about 15 to about 30° C. to complete crystallization of

TABLE I

|  | Kg. Recycled Agglomerates | Kg. Seed | Kg. Liquor | Percent DS | Kg. |
|---|---|---|---|---|---|
| First coating | 34.4 | | | 91 | 31.304 |
|  |  |  | 7.35 | 83 | 6.100 |
|  |  | 7.35 |  | 91.5 | 6.725 |
| After 15 minutes: Second coating |  |  | 10.55 | 83 | 8.756 |
|  |  | 10.55 |  | 91.5 | 9.653 |
| After 15 minutes: Third coating |  |  | 14.9 | 83 | 12.367 |
|  |  | 14.9 |  | 91.5 | 13.633 |
|  | 34.4 | 32.8 | 32.8 |  | 88.528 |
|  | 67.2 |  | 32.8 |  | or 11.46% $H_2O$ |
| Ratio |  | 2.04/1 |  |  |  | said liquor and to convert substantially all of the anhydrous crystals present in the agglomerates to the hydrate form.

7. Process according to claim 6 wherein said liquor is agitated with air before forming said thin layer on said agglomerates of step (a).

8. Process according to claim 7 wherein said conditioning covers a period of duration within the range of about 2 to 4 hours.

9. Process according to claim 1 wherein the amount of liquor sprayed onto the agglomerates in step (a) is about 20 to about 33 percent, by weight, of the agglomerates, dry basis, and the amount of dextrose particles used in step (b) is about 20 to 33 percent, by weight, of the wetted agglomerates, dry basis.

10. Process according to claim 9 wherein the temperature of said agglomerates being treated in step (a) is about 15 to 30° C. and that of said liquor is about 45 to 80° C.

11. Process according to claim 9 wherein steps (a) and (b) are repeated successively.

12. Process according to claim 9 wherein the said agglomerates from step (b) are subjected to conditioning in an atmosphere having a relative humidity within the range of about 70 to 90 percent and a temperature of about 15 to about 30° C. to complete crystallization of said liquor and to convert substantially all of the anhydrous crystals present in the agglomerates to the hydrate form.

13. Process according to claim 12 wherein steps (a) and (b) are repeated successively and wherein the final agglomerates are ground to a predetermined size and a portion of these is recycled.

References Cited

UNITED STATES PATENTS

| | | | |
|---|---|---|---|
| 988,261 | 3/1911 | Griere | 127—58 |
| 1,708,940 | 4/1929 | Daly | 127—58 |
| 2,369,231 | 2/1945 | Harding | 127—16 |
| 2,954,306 | 9/1960 | Bond et al. | 127—30 X |
| 3,239,378 | 3/1966 | Opila | 127—30 X |
| 3,265,533 | 8/1966 | Meisel | 127—38 |

FOREIGN PATENTS 567,181   12/1958   Canada.

MORRIS O. WOLK, *Primary Examiner.*

D. G. CONLIN, *Assistant Examiner.*